United States Patent
Kawashima et al.

(10) Patent No.: US 8,559,062 B2
(45) Date of Patent: Oct. 15, 2013

(54) IMAGE PROCESSING APPARATUS, IMAGE FORMING APPARATUS, IMAGE PROCESSING METHOD AND COMPUTER READABLE MEDIUM FOR CONTROLLING TONER CONSUMPTION

(75) Inventors: Hidetoshi Kawashima, Ebina (JP); Atsushi Kitagawara, Ebina (JP); Toshiyuki Yano, Ebina (JP); Toshio Koriyama, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 345 days.

(21) Appl. No.: 12/702,005

(22) Filed: Feb. 8, 2010

(65) Prior Publication Data
US 2011/0069325 A1 Mar. 24, 2011

(30) Foreign Application Priority Data
Sep. 24, 2009 (JP) ................................. 2009-218658

(51) Int. Cl.
- H04N 1/40 (2006.01)
- G06K 15/02 (2006.01)
- G06K 9/20 (2006.01)
- G06T 5/00 (2006.01)

(52) U.S. Cl.
USPC .............. 358/2.1; 358/1.9; 382/163; 382/167

(58) Field of Classification Search
None
See application file for complete search history.

(56) References Cited

U.S. PATENT DOCUMENTS

| | | | |
|---|---|---|---|
| 6,466,331 B1 * | 10/2002 | Tai et al. | 358/1.9 |
| 6,791,714 B1 * | 9/2004 | Ishimura | 358/1.9 |
| 7,085,006 B2 * | 8/2006 | Yokoyama et al. | 358/1.9 |
| 2005/0062990 A1 * | 3/2005 | Fujishige et al. | 358/1.9 |
| 2007/0003306 A1 * | 1/2007 | Jacobsen et al. | 399/79 |
| 2008/0158576 A1 * | 7/2008 | Yamaguchi et al. | 358/1.5 |
| 2008/0158610 A1 * | 7/2008 | Miyazaki | 358/3.01 |
| 2009/0018881 A1 | 1/2009 | Ito et al. | |

FOREIGN PATENT DOCUMENTS

| | | |
|---|---|---|
| JP | 2004-101870 A | 4/2004 |
| JP | 2004-177736 A | 6/2004 |
| JP | 2009-018460 A | 1/2009 |

OTHER PUBLICATIONS

Japanese Office Action issued on Jun. 19, 2013 in Japanese Application No. 2009-218658.

* cited by examiner

Primary Examiner — Barbara Reinier
(74) Attorney, Agent, or Firm — Sughrue Mion, PLLC

(57) ABSTRACT

An image processing apparatus includes: a printing unit that prints image information containing two or more colors with a plurality of color information corresponding to a plurality of specified colors; and a changing unit that changes, when a total toner amount is larger than a threshold value, at least one of the plurality of color information corresponding to one of the plurality of specified colors so that the total toner amount to be used for printing the image information is smaller than the threshold value.

13 Claims, 9 Drawing Sheets

FIG.3

| VARIATION OF GRADATION | LUT AT [BLACK + RED] | | | | | | | |
|---|---|---|---|---|---|---|---|---|
| | R | G | B | C | M | Y | K | CMYK Cov. |
| BLACK | 0 | 0 | 0 | 0 | 0 | 0 | 255 | 255 |
| ↑ | 1 | 0 | 0 | 0 | 1 | 1 | 254 | 256 |
| | ... | ... | ... | ... | ... | ... | ... | ... |
| | ... | ... | ... | ... | ... | ... | ... | ... |
| ↓ | 254 | 0 | 0 | 0 | 255 | 255 | 1 | 511 |
| RED | 255 | 0 | 0 | 0 | 255 | 255 | 0 | 510 |
| ↑ | 255 | 1 | 1 | 0 | 255 | 254 | 0 | 509 |
| | ... | ... | ... | ... | ... | ... | ... | ... |
| | ... | ... | ... | ... | ... | ... | ... | ... |
| ↓ | 255 | 254 | 254 | 0 | 1 | 1 | 0 | 2 |
| WHITE | 255 | 255 | 255 | 0 | 0 | 0 | 0 | 0 |
| BLACK | 0 | 0 | 0 | 0 | 0 | 0 | 255 | 255 |
| ↑ | 1 | 1 | 1 | 0 | 0 | 0 | 254 | 254 |
| | ... | ... | ... | ... | ... | ... | ... | ... |
| | ... | ... | ... | ... | ... | ... | ... | ... |
| ↓ | 254 | 254 | 254 | 0 | 0 | 0 | 1 | 1 |
| WHITE | 255 | 255 | 255 | 0 | 0 | 0 | 0 | 0 |

| OBJECT TYPE | OUTPUT COLOR VALUE | SPECIFICATION OF AREA | REDUCING METHOD |
|---|---|---|---|
| TEXT | BLACK | NO | (NO CHANGE) |
|  | SPECIFIED COLOR | REDUCTION | EDGE PRESERVATION |
| GRAPHICS | BLACK | REDUCTION | HUE PRESERVATION |
|  | SPECIFIED COLOR |  |  |
| IMAGE | BLACK |  |  |
|  | SPECIFIED COLOR |  |  |

IMAGE PROCESSING APPARATUS, IMAGE FORMING APPARATUS, IMAGE PROCESSING METHOD AND COMPUTER READABLE MEDIUM FOR CONTROLLING TONER CONSUMPTION

CROSS-REFERENCE TO RELATED APPLICATIONS

This application is based on and claims priority under 35 USC 119 from Japanese Patent Application No. 2009-218658 filed Sep. 24, 2009.

BACKGROUND

1. Technical Field

The present invention relates to an image processing apparatus, an image forming apparatus, an image processing method, and a computer readable medium.

2. Related Art

Recently, two-color document output has been utilized by many users, and a method of converting a full-color document to a two-color document having higher quality has been proposed.

SUMMARY

According to a first aspect of the present invention, there is provided an image processing apparatus including: a printing unit that prints image information containing two or more colors with a plurality of color information corresponding to a plurality of specified colors; and a changing unit that changes, when a total toner amount is larger than a threshold value, at least one of the plurality of color information corresponding to one of the plurality of specified colors so that the total toner amount to be used for printing the image information is smaller than the threshold value.

BRIEF DESCRIPTION OF THE DRAWINGS

An exemplary embodiment of the present invention will be described in detail based on the following figures, wherein:

FIG. 3 is a diagram showing an example of a look-up table of converting RGB to CMYK;

DETAILED DESCRIPTION

Exemplary embodiments according to the present invention will be described hereunder in the following order.

1. First exemplary embodiment (summary of image processing apparatus, configuration of image forming apparatus, configuration of each part)

2. Second exemplary embodiment (specific example of each part)

3. Third exemplary embodiment (image processing program)

<1. First Exemplary Embodiment>

Figure 1:
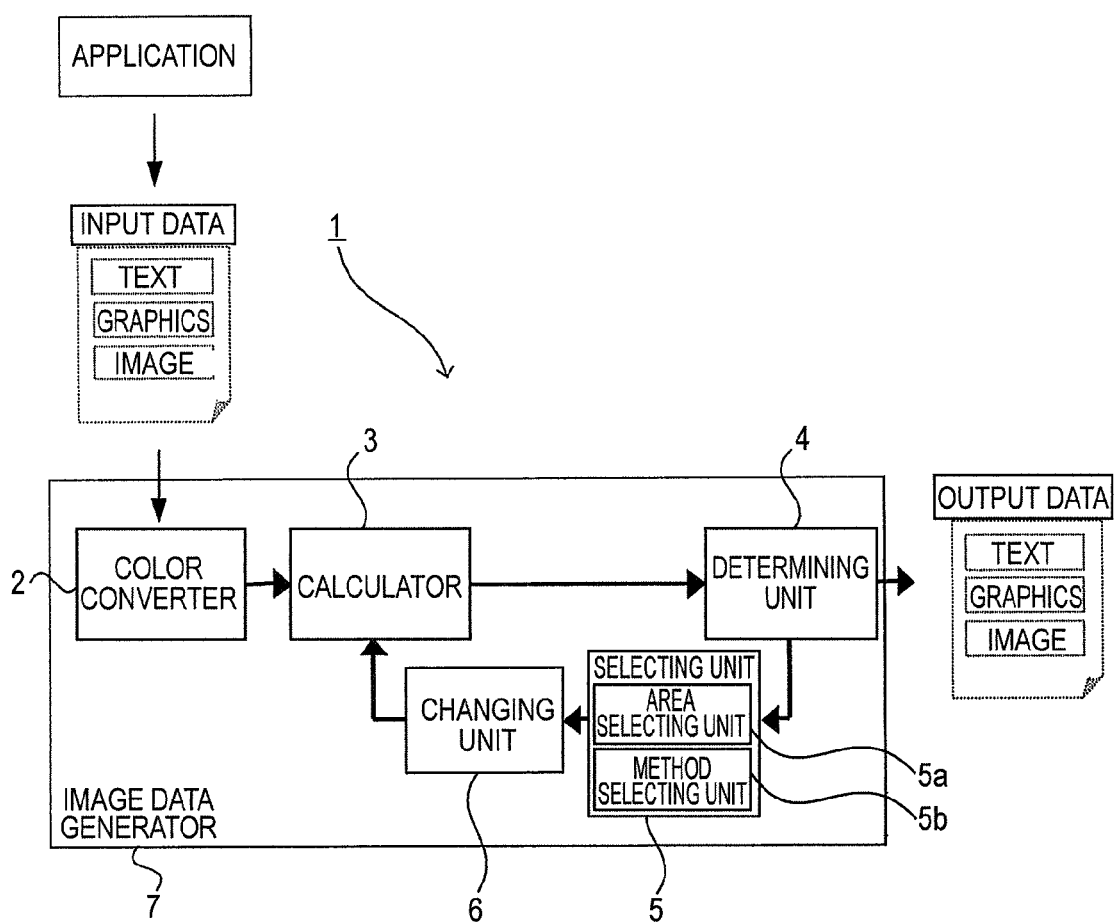
FIG. 1 is a block diagram showing an example of the configuration of an image processing apparatus according to an exemplary embodiment.

FIG. 1 is a block diagram showing an example of the construction of an image processing apparatus according to a first exemplary embodiment. The image processing apparatus of this exemplary embodiment is mainly implemented as one function of a copying machine, a printing device, a multifunction machine (an apparatus having plural functions such as a copying function, a printing function, an image inputting function, etc.), etc. The image processing apparatus according to the exemplary embodiment is also implemented as one function executed by a computer.

The image processing apparatus according to this exemplary embodiment executes processing of converting a color image into plural specified colors. The plural specified colors contain black and specific colors, and the specific colors contain colors such as red, blue, etc. other than black. In this exemplary embodiment, the plural specified colors to which a color image is converted are set to two colors of black and a specific color, however, the present invention is not limited to the two colors. In a two-color printing operation in which a color image is converted to two specific colors and then printed out, the print cost can be more greatly suppressed as compared with a case where a color image is printed with all colors. This is because the total consumption (use) amount of toner materials can be reduced. Furthermore, users utilizing two-color printing require that a portion to be emphasized is properly emphasized with keeping a low printing cost.

In consideration of the above requirement, the image processing apparatus of this exemplary embodiment is characterized in that when two-color printing is instructed, the amount of toner to be used (toner consumption amount) for the two-color printing is calculated, and a color value is not changed when the calculated toner consumption amount is not more than a predetermined threshold value whereas a color value in an area to be processed with a specified color within a page is changed so that the toner consumption amount is kept to be equal to the threshold value or less (falls within the threshold value) when the calculated toner consumption amount exceeds the predetermined threshold value.

[Configuration of Image Processing Apparatus]

In order to implement the above-described characteristic of the image processing apparatus, the image processing apparatus 1 according to this exemplary embodiment mainly includes a color converter 2, a calculator 3, a determining unit 4, a selecting unit 5 and a changing unit 6 as shown in FIG. 1. Here, the color converter 2, the calculator 3, the determining unit 4, the selecting unit 5 and the changing unit 6 are provided to an image data generator 7 of the image processing apparatus 1. The image generator 7 receives, as input data, image data generated by an application software or the like, converts the image data (color image) as the input data to image data of specific two colors, and then outputs the thus-converted image data as output data.

The attributes of the image data as a processing target are text, graphics and image. The text is data configured by font data such as characters, numerals, etc. The graphics is data configured by a figure, a picture, a graph or the like which is generated by a computer. The image is data such as a photograph or the like which is taken by an image input device.

[Construction of Each Part]

The color converter 2 serves to convert input image data into color information of specific two colors. In this exemplary embodiment, the specific two colors are set to black and a specified color. The color converter 2 executes the processing of calculating a brightness component from pixel data of each color of R (red), G (green) and B (blue), for example, and allocating the specified color corresponding to the calculated brightness component to the pixel data. The allocation of the specified color corresponding to the brightness component is performed by referring to values which are obtained by executing Gray conversion on pixel values of RGB. Accordingly, the color pixel data are converted to pixel data within a hue plane of a specified color while the brightness is kept. The color converter 2 directly outputs black when the color pixel data is black.

The calculator 3 calculates the amount of toner to be consumed (used) (hereinafter referred to as "toner consumption amount") from the two-color image data obtained by the color conversion in the color converter 2. In this exemplary embodiment, the image data represented by black and the specified color is converted to data of Y (yellow), M (magenta), C (cyan) and K (black) in the calculator 3, and the amount of toner to be used is calculated.

In this exemplary embodiment, it is assumed that a toner consumption amount for an area in which toner is used (a print target area) is calculated by repetitively adding a toner consumption amount per pixel of the print target area at the frequency corresponding to the number of the pixels of the print target area (i.e., by multiplying the toner consumption amount per pixel by the number of the pixels of the print target area)

The determining unit 4 determines whether the toner consumption amount calculated in the calculator 3 exceeds a preset threshold value or not. The threshold value is set in consideration of the printing cost by a user, and it is changed as occasion demands. The threshold value is represented by an average consumption (use) amount of toner per pixel.

When it is determined that the toner consumption amount calculated in the calculator 3 does not exceed the threshold value, the determining unit 4 directly outputs the image data of the two colors. On the other hand, when it is determined that the toner consumption amount calculated in the calculator 3 exceeds the threshold value, the determining unit 4 transmits the image data of the two colors to the changing unit.

When it is determined in the determining unit 4 that the toner consumption amount exceeds the threshold value, the changing unit 6 executes the processing of changing the color information of at least one color of the two-color image data so that the toner consumption amount is reduced. Here, in order to change the image data, the changing unit 6 executes the processing on the basis of the change target area selected in the selecting unit 5 and the changing method.

The selecting unit 5 has an area selecting unit 5a for selecting a target area for which image data are changed in the changing unit 6, and a method selecting unit 5b for selecting a method of changing color data in the changing unit 6. The area selecting unit 5a selects the color-data change target area in accordance with the attribute (text, graphics, image) of the image data. For example, an area whose image-data attribute is "graphics" or "image" is selected as a color-data change target area, for example. Furthermore, not only the color-data change target area is selected in accordance with the attribute of the image data, but also an image-data change target area may be selected. With respect to an area having a text as the attribute of image data, an area out of the contour of the area having the text is selected as a color-data change target area.

Furthermore, the area selecting unit 5a may select, as a change target area, only an area represented by only the specified color in the two-color image data.

The method selecting unit 5b selects a color-data changing method in accordance with the attribute of the image data (text, graphics, image). For example, with respect to an area whose image-data attribute is "graphics" or "image", a method of changing color data with preserving hue. Furthermore, when the attribute of image data is "text", the method selecting unit 5b selects a changing method that does not affect character quality (does not cause discontinuity or the like).

The method selecting unit 5b selects a method which is changed by the specified color as well as the attribute of the image data. For example, when the specified color is red and a text is represented by red, M (magenta) is preserved, and Y (yellow) is reduced. Accordingly, the hue is slightly changed, however, occurrence of character quality (discontinuity) is suppressed. Conversely, in the case of graphics, weight is given to color taste and the color value is changed with preserving hue.

With respect to the selecting method of the method in the area selecting unit 5a and the method selecting unit 5b of the selecting unit 5, a method which is preset in the image processing apparatus 1 may be used, or a method which is selected and set by a user's wish may be used. When the method is selected and set by the user's wish, a user selects the method from the content displayed on a display (not shown) of the image processing apparatus 1. At this time, the calculator 3 may calculate the toner consumption amount with respect to each of plural colors in advance, present to the user those colors whose toner consumption amounts are not more than the threshold value in the plural colors, and prompt the user to select his/her desired color from these presented colors. Furthermore, when the user selects an image-data change target area by the area selecting unit 5a, the specified color of the image data in the selected area may be changed so that the toner consumption amount of the area is not more than the threshold value. In this case, when colors are presented to the user, colors whose toner consumption amounts are not more than the threshold value when the color of the image data in the selected area is changed may be presented to the user.

When the image data of the two colors are changed in the changing unit 6, the toner consumption amount may be calculated in the calculator again as occasion demands, and the determination based on the threshold value may be performed in the determining unit 4. Furthermore, the change of the image data of the two colors in the changing unit 6, the calculation of the toner consumption amount in the calculator 3 and the determination based on the threshold value in the determining unit 4 may be repetitively executed until the toner consumption amount does not exceed the threshold value.

<Second Exemplary Embodiment>

[Specific Example of Each Part]

Figure 2:
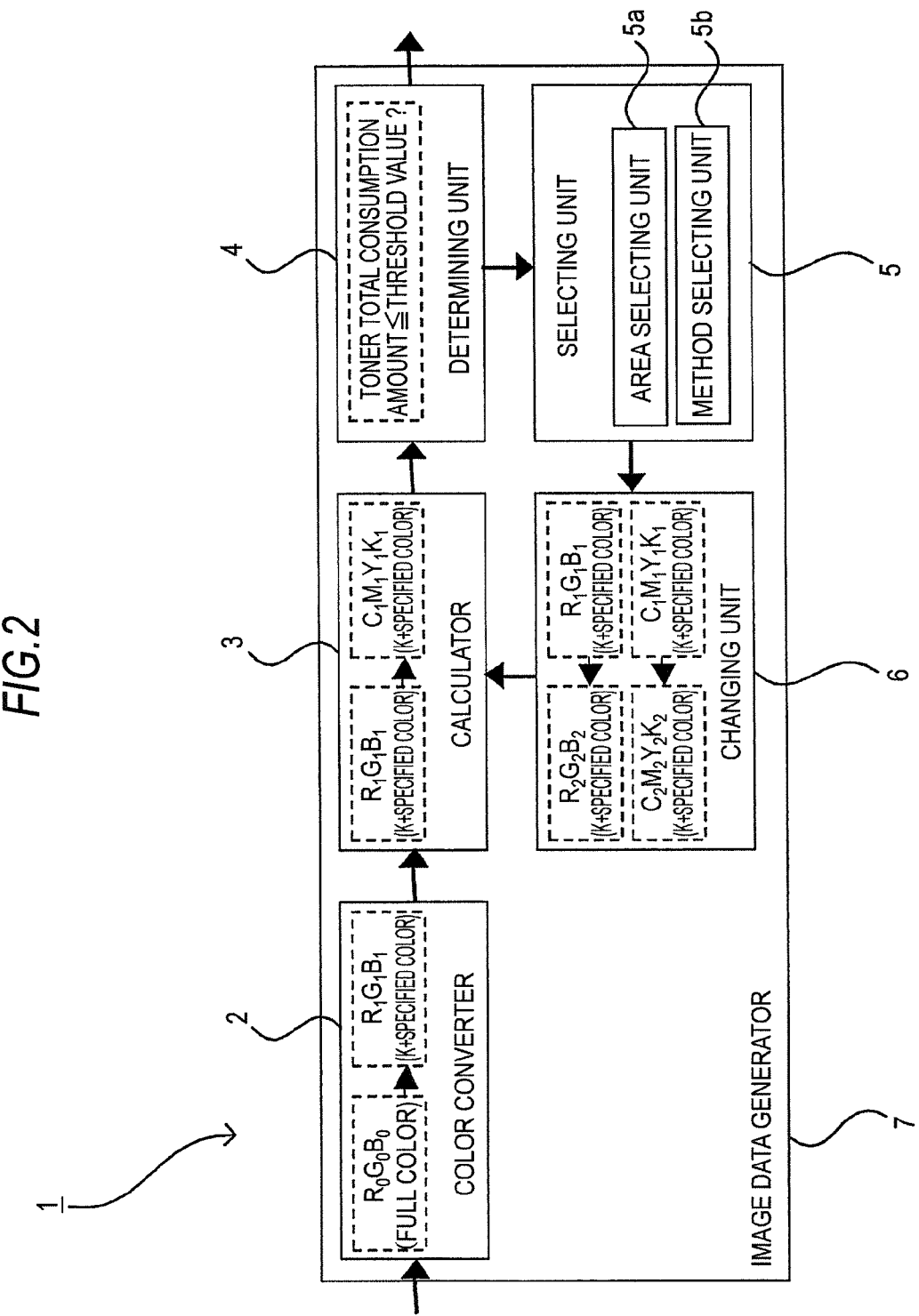
FIG. 2 is a diagram showing a specific example of respective parts constituting an image data generator.

FIG. 2 is a diagram showing a specific example of each part constituting the image data generator. The color converter 2 converts full-color image data of $R_0G_0B_0$ to two-color image data of black and a specified color of $R_1G_1B_1$. A method using a look-up table or a method using a calculation expression is applied to the conversion from the image data of the full-color $R_0G_0B_0$ to the two-color image data of the black and specified color $R_1G_1B_1$. In this case, a method using an HSV space (H: hue, S: color saturation, V: brightness (color value)) and a Gray conversion value as an example of the method using the calculation expression will be described.

It is assumed that general conversion methods (Gray value=255−(0.3×R+6×G+0.1×B), etc.) are used for the conversion between RGB and HSV and the conversion from RGB to Gray values.

Specifically, an $H_0S_0V_0$ value and a Gray value (Gy0) are first calculated from input image data of full color $R_0G_0B_0$. Subsequently, the hue $H_0$ of the calculated $H_0S_0V_0$ is inversely converted to the hue $H_1$ of the specified color to obtain '$R_0'G_0'B_0'$'. Furthermore, the Gray value ($Gy_0'$) is calculated from the calculated $R_0'G_0'B_0'$ value. Furthermore, the Gray value (Gyg) on the Gray axis which satisfies RgGgBg= [max ($R_0'G_0'B_0'$), max ($R_0'G_0'B_0'$) max ($R_0'G_0'B_0'$)] is calculated. Here, max (argument) represents a function of returning the maximum value out of arguments.

$R_1$, $G_1$, $B_1$ are calculated by the following expressions.

$R_1$=max ($R_0'G_0'B_0'$)−($Gy_0$—Gyg)×(Rg−$R_0'$)/($Gy_0'$−Gyg)

$R_1$=max ($R_0'G_0'B_0'$)−($Gy_0$−Gyg)×(Gg−$G_0'$)/($Gy_0'$−Gyg)

$B_1$=max ($R_0'G_0'B_0'$)−($Gy_0$−Gyg)×(Bg−$B_0'$)/($Gy_0'$−Gyg)

[Conversion to Black and Specified Color (Red)]

For input $R_0G_0B_0$=[192, 192, 64], $H_0S_0V_0$=[60, 0.67, 192], Gy0=77

Hue of red (specified color) is represented as follows because H=0, $H_0'S_0'V_0'$=[0, 0.67, 192]

When $H_0'S_0'V_0'$ is inversely converted to RGB, $R_0'G_0'B_0'$=[192, 64, 64], Gy0'=153

Furthermore, max ($R_0'G_0'B_0'$)=192, and thus the gray value of RGB=[192, 192, 192] is represented by Gyg=63. Accordingly, $R_1$, $G_1$, $B_1$ are represented as follows.

$R_1$=192

$G_1$=192−(77−63)×(192−64)/(153−63)=172

$B_1$=192−(77−63)×(192−64)/(153−63)=172

The calculator 3 converts the two-color image data $R_1G_1B_1$ obtained through the conversion in the color converter 2 into two-color image data $C_1M_1Y_1K_1$, and calculates the toner consumption amount.

FIG. 3 shows a part of a lookup table for the conversion from RGB to CMYK. Specifically, FIG. 3 shows an example of the lookup table for converting $R_1G_1B_1$ to $C_1M_1Y_1K_1$ for the two-color image data of black and red.

In FIG. 3, a table at the upper stage represents the axis of black-red-white, and a table at the lower stage represents the gray axis of black-white. When gray data (R=G=B) is input, the table at the lower stage is referred to, and in the other cases, the table at the upper stage is referred to.

The calculator 3 calculates the toner consumption amount on the basis of the relationship between RGB and CMYK Cov. in the lookup table of FIG. 3. Here, CMYK Cov. represents the sum of respective gradation values of CMYK.

Figures 4, 5:
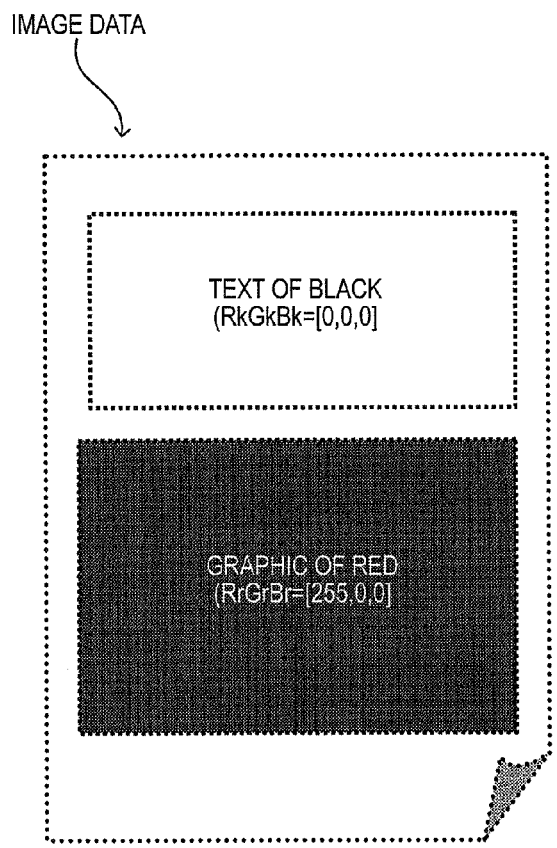
FIG. 4 is a diagram showing calculation of a toner consumption amount (the amount of consumed (used) toner)
FIG. 5 is a diagram showing an example of selection based on attribute and color of image data.

FIG. 4 is a diagram showing the calculation of the toner consumption (use) amount.

In FIG. 4, image data contains a text area and a graphics area, and this image data is two-color image data in which the text area is converted to black and the graphics area is converted to a specified color (red). In this case, the calculator refers to the lookup table shown in FIG. 3 to obtain CrMrYrKr=[0,255,255,0] because the RGB value of Red of the input two-color image data is represented by RrGrBr=[255, 0, 0]. Furthermore since the RGB value of black is represented by RkGkBk=[0,0,0], the calculator refers to the lookup table shown in FIG. 3 to obtain CkMkYkKk={0,0,0,255].

The calculator calculates the toner total consumption amount to be used from the calculated CMYK value according to the following expressions.

Toner consumption amount of the red area=(255+ 255)×the number of pixels of the R area     (1)

Toner consumption amount of the black area=255×the number of pixels of the black area     (2)

Toner total consumption amount of the image data=the toner consumption amount of the red area+the toner consumption amount of the black area     (3)

The determining unit 4 shown in FIG. 2 determines whether the toner total consumption amount calculated in the calculator 3 exceeds a preset threshold value. When it is determined that the toner total consumption amount does not exceed the threshold value, the determining unit 4 directly outputs the two-color image data obtained through the conversion in the color converter 2. On the other hand, when it is determined that the toner total consumption amount exceeds the threshold value, the determining unit 4 transmits the two-color image data to the changing unit 6.

The changing unit 6 changes the image data of at least one color in the image data of the two colors according to the area and the method selected by the selecting unit 5. Through this change, the toner total consumption amount is kept to be equal to the threshold value or less (fall within the threshold value).

Here, the selection of the changing target and method of the image data by the selecting unit 5 will be described.

The selecting unit 5 selects an area to be changed by the changing unit 6 and a changing method in accordance with the attribute of the image data and the colors of the two-color image data. The area to be changed is selected by the area selecting unit 5a, and the changing method is selected by the method selecting unit 5b.

FIG. 5 is a diagram showing an example of the selection based on the attribute and color of the image data. The attribute of the image data contains "text", "graphics" and "image". The color contains black and a specific color. An area as a changing target and a changing method are selected on the basis of the combination of the attribute and the color described above.

In the example shown in FIG. 5, when the attribute of the area is "text" and the color of the area is black, the area concerned is not selected as a changing target. That is, no change is selected as the changing method. Furthermore, when the attribute of the area is "text" and the color is a specified color (for example, red), the area concerned is selected as a changing target. In this case, preservation (saving) of the edge (contour) of the text is selected as the changing method. In other words, a method of changing portions other than the contour of the text is selected. In this case, the change of the portions other than the contour is selected as the changing method, however, the portions other than the contour may be selected as a changing target.

When the attribute of the area is "graphics" or "image", the area concerned is certainly selected as a changing target irrespective of the color type (black or the specified color). The processing of changing the area (value) so that the toner consumption amount is reduced while the hue of the specified color is preserved is selected as the changing method. FIG. 5 shows an example, and thus other area selecting methods and other method selecting methods may be used.

The changing unit 6 shown in FIG. 2 changes the color data of at least one color in the color data of two colors according to the selection of the selecting unit 5 so that the toner total consumption amount is kept to be equal to the threshold value or less (fall within the threshold value).

The change of the color data by the changing unit 6 will be specifically described below. That is, in order to keep the toner total consumption amount equal to the threshold value X or less to fall within the threshold value X, the black area of the text is not reduced, and thus the average toner consumption amount per pixel of the area of the specified color (for example, red) is calculated as follows.

Average toner consumption amount per pixel in the red area=(X−toner consumption amount of the black area)/(the number of pixels of the red area)

On the basis of the calculated average toner consumption amount per pixel in the red area, the corresponding value is selected from the look-up table shown in FIG. 3, and the pixel data of the red area is changed to the selected value.

In the lookup table shown in FIG. 3, CMYK Cov. is reduced in one direction from red (RGB=[255, 0, 0]) to white (RGB=[255, 255, 255]), however, CMYK Cov. is not necessarily increased in one direction from red (RGB=[255, 0, 0]) to black (RGB=[0, 0, 0]). Accordingly, with respect to the change of the pixel data, it is required to determine the change value while checking the value of CMYK Coy.

When the changing method of the edge preservation in the text area is selected in the selecting unit 5, the changing unit 6 makes no change for red characters (RGB=[255, 0, 0]) of the edges of the text (corresponding to one pixel to several pixels which are preset from the contour), and CMYK=[0, 255, 255, 0] is obtained from the lookup table shown in FIG. 3.

With respect to the edge preservation, the pixel data of the edge may be changed so that the edge quality is not affected. For example, with respect to CMYK=[0, 255, 255, 0] corresponding to the red character (RGB=[255, 0, 0]), a method of reducing the data (gradation value) of Y (yellow) while the data (gradation value) of M (magenta) is preserved is used. At this time, by reducing the gradation value from 255, a screen pattern comes into view through screen processing. However, the gradation value Y which is visually inconspicuous is reduced while preserving the gradation value of M, whereby the toner consumption amount can be reduced with suppressing the influence on the edge quality of characters.

The changing unit 6 may change the pixel data in accordance with the attribute of the image data to reduce the toner consumption amount. For example, when the attribute of an area as a changing target is "text" or "graphics", pixel data nearest to input pixel data is selected in the reducing direction of brightness or color saturation. Furthermore, when the attribute of the area is "image", pixel data having the highest toner consumption amount with respect to the number of pixels×pixel data (gradation value) is set as a reference pixel data, pixel data which is expected to reduce the toner consumption amount and nearest to the reference pixel data, and the whole pixel data are also changed in accordance with the degree of the change of the reference pixel data.

<Third Exemplary Embodiment>
[Image Processing Program]

The image processing program of this exemplary embodiment is implemented as a printer driver for a computer or a personal computer in the image processing apparatus.

[Example of Hardware Configuration of Image Processing Apparatus]

Figure 6:
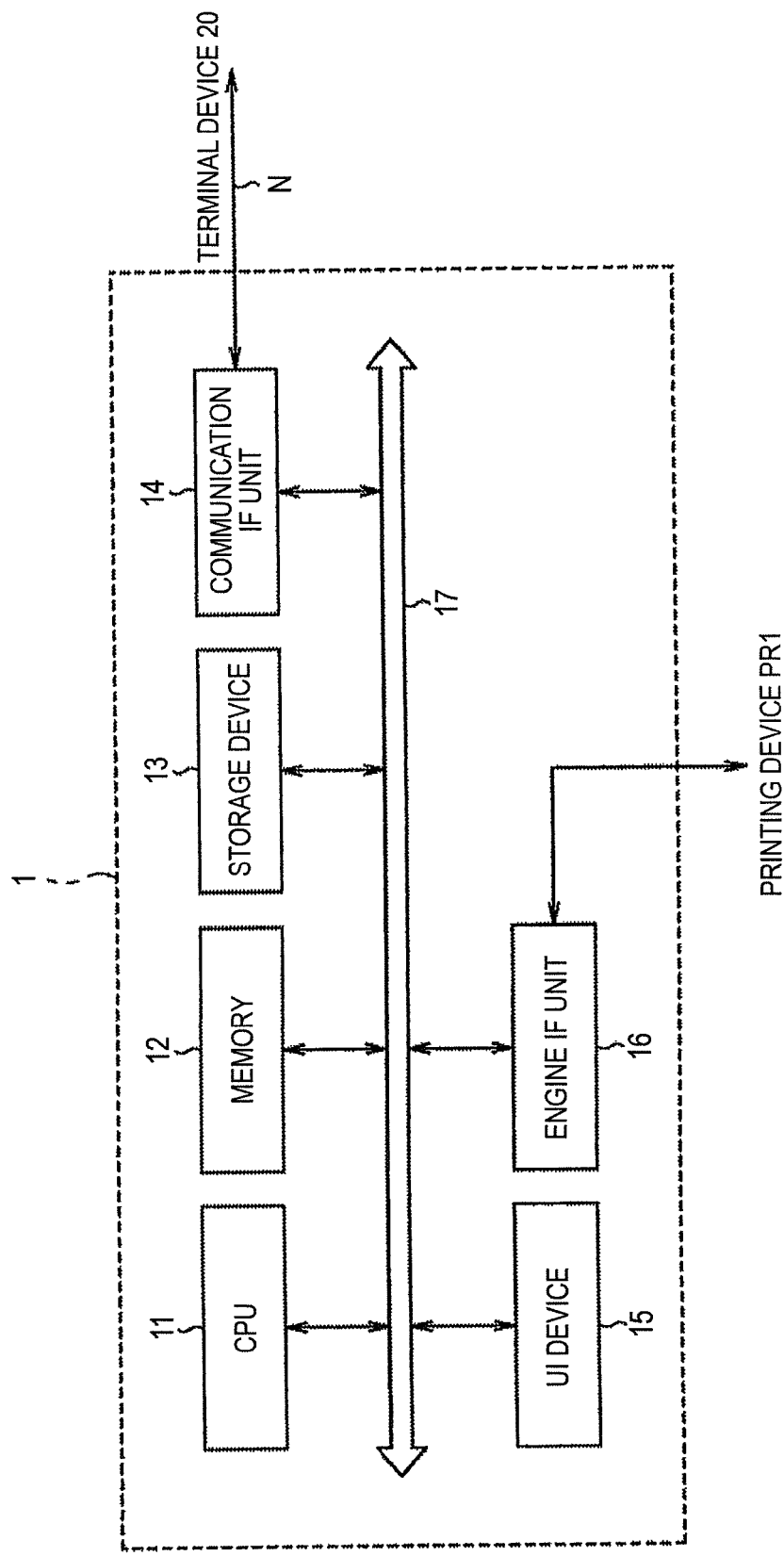
FIG. 6 is a diagram showing an example of a hardware configuration of the image processing apparatus.

FIG. 6 is a diagram showing an example of the hardware configuration of the image processing apparatus. That is, the image processing apparatus 1 has CPU 11, a memory 12, a storage device 13 such as a hard disk drive (HDD) or the like, a communication interface (IF) unit 24 for transmitting and receiving data with a terminal device 20 such as a personal computer or the like through a communication unit N, a user interface (UI) device 15 constructed by a touch panel or a liquid crystal display, and an engine IF unit 16 for transmitting and receiving data with a printing device PR1. These constituent elements are connected to one another through a control bus 17.

CPU 11 executes predetermined processing on the basis of an image processing program stored in the memory 12 or the storage device 13, and controls the operation of the image processing apparatus 1.

The image forming apparatus according to this exemplary embodiment contains the printing device PR1 as an image forming unit in addition to the hardware construction of the image processing apparatus shown in FIG. 6. The printing device PR1 receives image information transmitted form the image processing apparatus 1 to form an image by using four or more developing units. The <developing units correspond to four colors of Y (yellow), M (magenta), C (cyan), K (black), and forms an image corresponding to image information of each color. The images of the respective colors formed by the corresponding developing units are transferred onto a medium such as a sheet or the like by a transfer unit while superposed on one another, and then fixed by a fixing unit, whereby a color image is formed on the medium. The medium having the color image formed thereon is transported to the outside of the apparatus by a transporting unit. A printer, a copying machine, a facsimile machine, a multifunction machine or the like may be applied as the image forming apparatus.

[Hardware Configuration of Computer]

Figure 7:
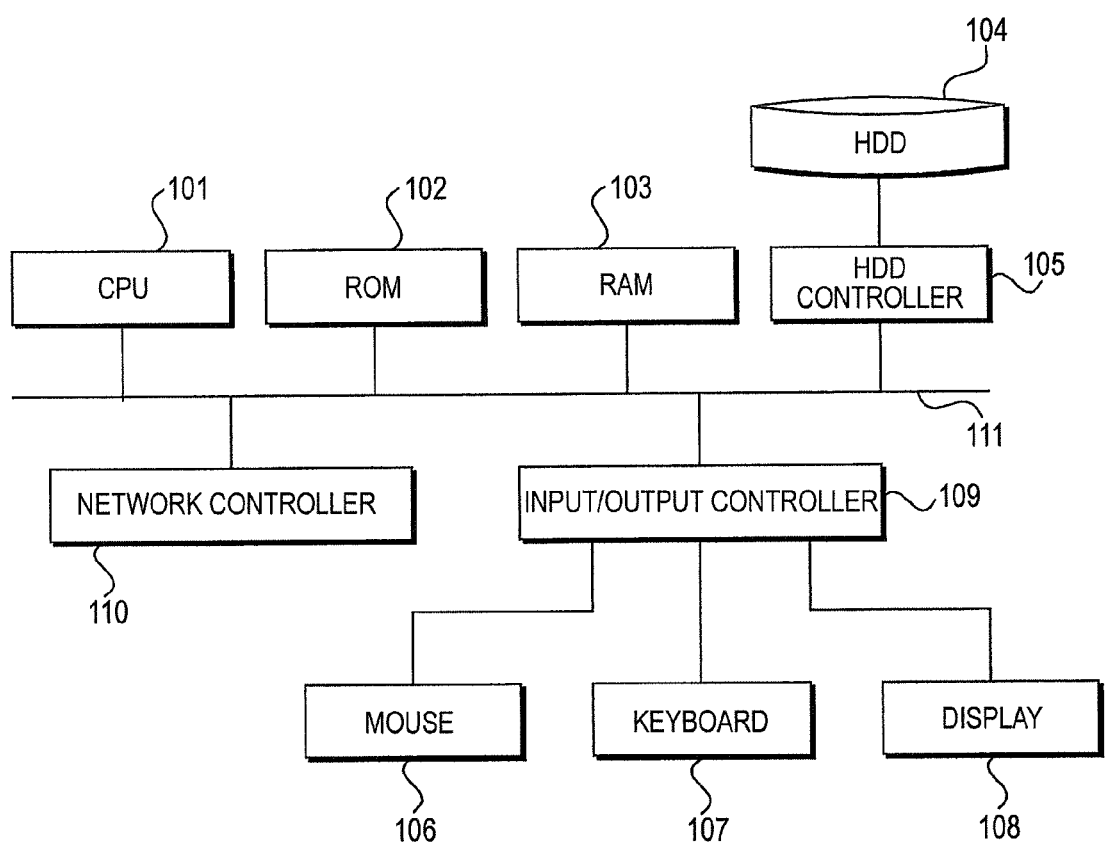
FIG. 7 is a block diagram showing an example of a hardware configuration of a computer.

FIG. 7 is a block diagram showing an example of the hardware configuration of the computer. In the hardware configuration of the computer, CPU (Central Processing Unit) 101, ROM (Read Only Memory) 102, RAM (Random Access Memory) 103, HDD (Hard Disk Drive) 104, an HDD controller 105, a mouse 106, a keyboard 107, a display 108, an input/output controller 109 and a network controller 110 are connected to one another through a bus 111.

The image processing program according to this exemplary embodiment has steps executed by CPU 11, 101 in the hardware configuration of the image processing apparatus or the computer. Furthermore, the image processing program according to this exemplary embodiment is recorded in a recording medium such as CD-ROM or the like, or distributed through a communication unit.

Figure 8:
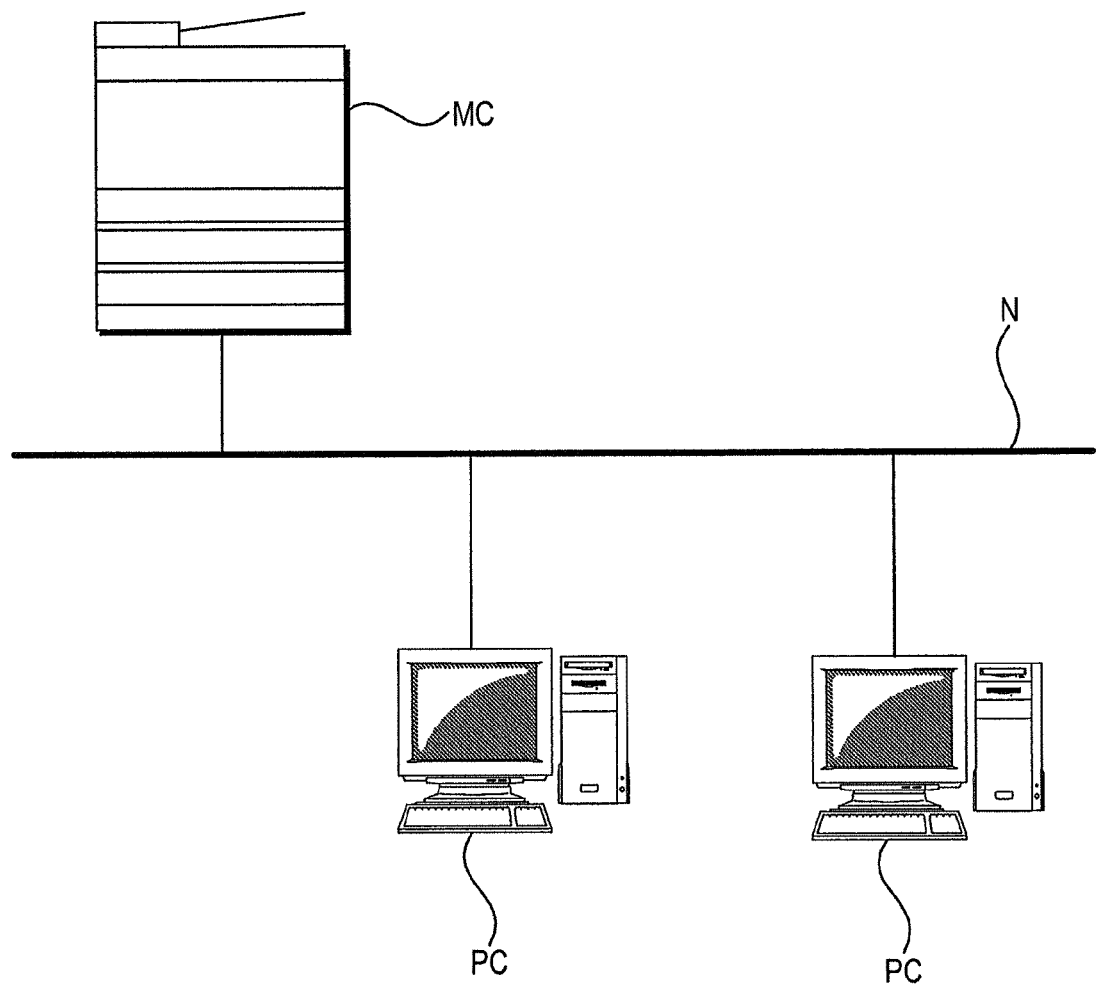
FIG. 8 is a diagram showing an example of the configuration of a communication unit between a personal computer and the image processing apparatus.

FIG. 8 is a diagram showing an example of the configuration of the communication unit between the personal computer and the image forming apparatus. The personal computer PC is connected to the image forming apparatus MC through the communication unit N such as LAN (Local Area Network) or the like. The image forming apparatus MC is a copying machine, a multifunction machine or a printing device, for example.

When the personal computer PC has a hardware configuration shown in FIG. 7, the image processing program according to this exemplary embodiment is executed as software of the personal computer PC. A printer driver or an image processing application software may be used as the software by which the image processing program of this exemplary embodiment is executed. The processing of changing at least one color of the two-color image data is executed according to the image processing program of this exemplary embodiment executed by these software.

[Image Processing Program]

Figure 9:
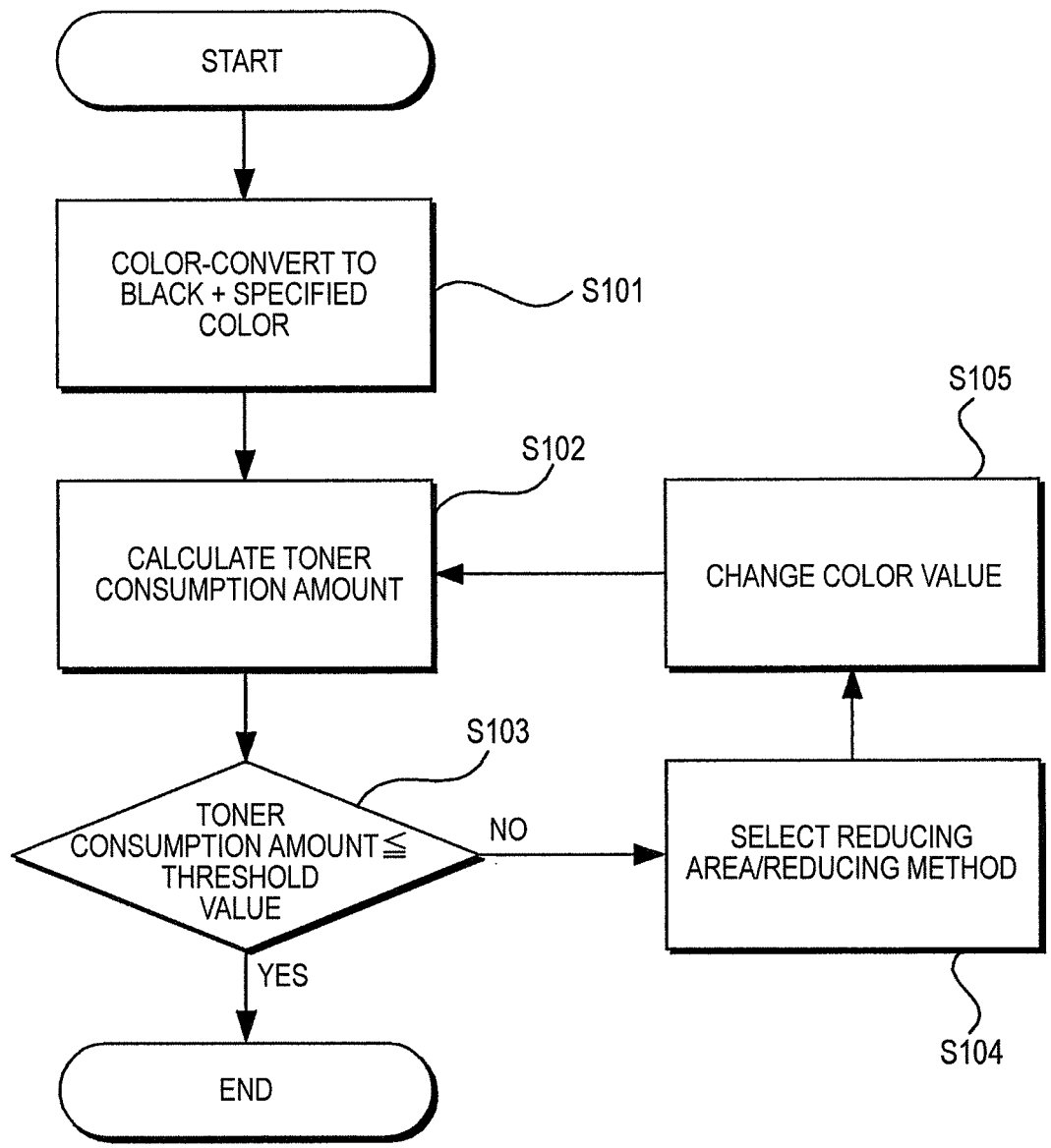
FIG. 9 is a flowchart showing an image processing program according to the exemplary embodiment.

FIG. 9 is a flowchart showing the image processing program according to the exemplary embodiment. First, the processing of converting full-color image data transmitted from an application software or the like to color data of two specific colors is executed (step S101). In this case, the full-color image data are converted to color data of two colors of black and a specified color.

Subsequently, a toner consumption amount is calculated form the color data information of the two colors obtained through the conversion is calculated (step S102). With respect to the calculation of the toner consumption amount, the color space of the image data of the two colors (for example, RGB) is converted to the color space for print (for example, CMYK), and the toner consumption amount of the color used in the thus-obtained color space is calculated. The toner consumption amount is calculated by referring to the lookup table shown in FIG. 3 as described above.

Subsequently, the calculated toner consumption amount and the threshold value are compared with each other (step S103). The threshold value is set by the user in consideration of the print cost, and it is changeable as occasion demands. For example, the threshold value is represented by the toner average consumption amount per pixel.

When the comparison result indicates that the toner consumption amount does not exceed the threshold value, the image data of the two colors are directly output. On the other hand, when the toner consumption amount exceeds the threshold value, an area for which the toner consumption amount of at least one color of the two colors is reduced, and a reducing method are selected (step 104).

Figure 10:
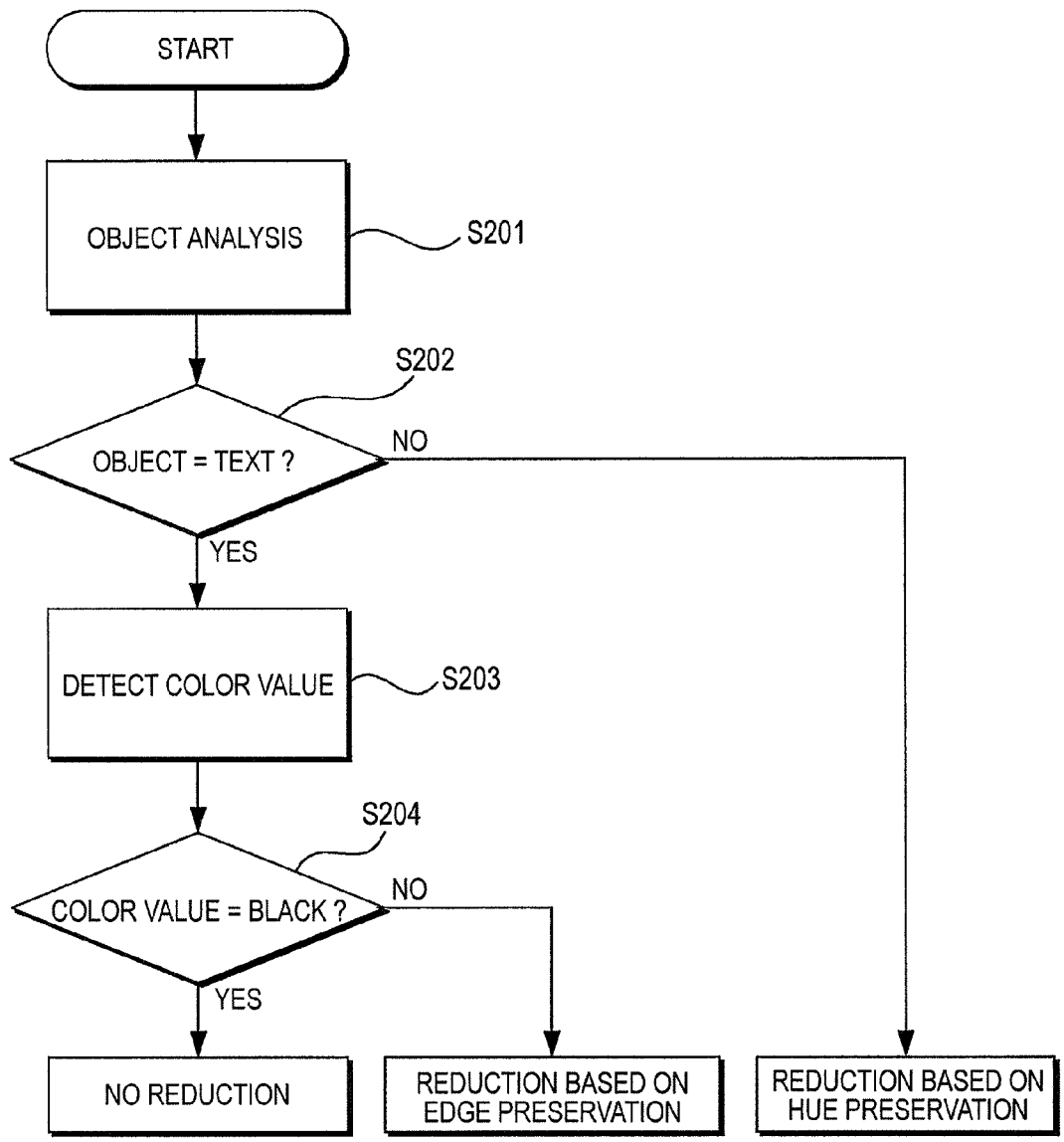
FIG. 10 is a flowchart showing selection processing of a toner-amount reducing area and a toner-amount reducing method.

FIG. 10 is a flowchart showing the processing of selecting the area for which the toner consumption amount is reduced and the method of reducing the toner consumption amount. First, an object is analyzed from the image data (step S201). The object is data of a print target object contained in the image data. The analysis is the processing of investigating the attribute of the object. In the object analysis, an analysis result obtained at the previous stage may be embedded as a tag (additional information) in an image.

Subsequently, it is determined whether the attribute of the object is "text" or not (step S202). When the attribute of the object is something other than "text", the reducing method based on the preservation of hue is selected for the area of the object. The reducing method based on the preservation of hue is to change the color value so that the toner consumption amount is reduced with keeping the hue of the specified color. That is, when the object is something other than "text", that is, the object is "graphics" or "image", the area of the object is targeted as an area for which the toner consumption amount is reduced, and the reducing method which gives weight to color tone and preserves hue is selected.

When the attribute of the object is "text", the color value of a text area is detected (step S203), and it is determined whether the detected color value is black or not (step S204). When this determination result represents that the color value indicates black, no-reduction of the toner consumption amount is selected for the area of the text. That is, when the object is "text" and the output color is black, particularly, importance is put on the image quality, and thus no-reduction is selected.

On the other hand, when the color value does not indicate black, the reducing method based on the edge preservation is selected for the text area. That is, when the object is "text" and the output color is a specified color (a color other than black), the reduction of the toner consumption amount is executed, however, the edge-preservation-based reduction method is selected so that the character quality is kept as much as possible. Here, the reducing method based on the edge preservation is a method of using the original color value for the edge (contour) of the text and changing the color value for the portions other than the edge, or a method of changing the color value so that appearance of the edge of the text is not affected.

Returning to FIG. 9, after the reducing area and the reducing method are selected in step S104, the color value is changed (step S105). In the change of the color value, the selected reducing method is applied to the area selected in step S104. Accordingly, the color value is changed with respect to at least one color of the color data of two colors so that the toner consumption (use) amount is reduced.

After the color value is changed, the processing returns to step S102, and the calculation of the toner consumption amount on the basis of the changed color value is executed. Thereafter, the calculated toner consumption amount and the threshold value are compared with each other (step S103). When the toner consumption amount does not exceed the threshold value, the color data of the two colors are directly output. When the toner consumption amount exceeds the threshold value, the color value is changed again. This processing is repeated until the toner consumption amount does not exceed the threshold value.

In this case, the processing of the steps S102 to S105 is repeated. However, when the color value is changed so as to offset the difference between the toner consumption amount and the threshold value in the color value changing processing (step S105) which is first executed, the processing is not returned from the step S105 to the step S102 and the image data of the two color after the changing processing offsetting the difference between the toner consumption amount and the threshold value may be output.

According to the operation of the image processing program as described above, when the toner consumption amount (total consumption amount) is not less than the estimated toner consumption amount (total consumption amount), the color value of at least one color of the two colors is changed to adjust the toner consumption amount, so that printing is executed with a toner consumption amount matched with a charging rate.

In order to control the proper toner consumption amount matched with the charging rate, the image processing apparatus or the image forming apparatus as described above is further equipped with a setting unit for presetting a charge to be paid when a user prints image information, and a threshold value changing unit for changing the threshold value of the toner consumption amount in conformity with the set charge. When the user sets a desired charge by the setting unit, the threshold value changing unit changes the threshold value so that the actual charge is converged to the set charge. The threshold value changing unit determines the relationship between the charge and the toner consumption amount from a table or a calculation expression. Accordingly, the control of the toner consumption amount which is converged to the charge set by the user is implemented.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a converting unit that converts image information having no less than three color information into image information having two color information;
a printing unit that prints the converted image information having the two color information;
a changing unit that, when a total toner amount is larger than a threshold value, changes one of the two color information of the converted image information so that the total toner amount to be used for printing the converted image information is smaller than the threshold value; and
a method selecting unit that selects a method of changing the one of the two color information by the changing unit,
wherein the method selecting unit selects the method of changing the one of the two color information according to an attribute of the image information, and the method selecting unit changes the one of the two color information with preserving hue for an area in which the attribute of the image information is graphics or an image.

2. An image processing apparatus comprising:
a color converting unit that converts image information having no less than three color information into image information having two color information;
a calculating unit that calculates a total toner amount used for printing the image information according to the two color information obtained through the conversion of the color converting unit;
a determining unit that determines whether the total toner amount calculated by the calculating unit exceeds a threshold value, or not;
a printing unit that prints the converted image information having the two color information;
a changing unit that, when a total toner amount is larger than the threshold value, changes one of the two color information of the converted image information so that the total toner amount to be used for printing the converted image information so that the total toner amount is smaller than the threshold value; and
a method selecting unit that selects a method of changing the one of the two color information by the changing unit,
wherein the method selecting unit selects the method of changing the one of the two color information according to an attribute of the image information, and the method selecting unit changes the one of the two color information with preserving hue for an area in which the attribute of the image information is graphics or an image.

3. The image processing apparatus according to claim 2, further comprising: an area selecting unit that selects a target area where the one of the two color information is changed by the changing unit.

4. The image processing apparatus according to claim 3, wherein in accordance with an attribute of the image information, the area selecting unit selects the target area where the one of the two color information is changed.

5. The image processing apparatus according to claim 4, wherein the area selecting unit selects an area where the attribute of the image information is graphics or image.

6. The image processing apparatus according to claim 2, wherein the method selecting unit selects the method of changing the one of the two color information for an area other than a contour in which the attribute of the image information is a text.

7. An image forming apparatus comprising:
a color converting unit that converts image information having no less than three color information into image information having two color information;
an image forming unit that includes four or more developing units, and forms an image with the developing units;
a calculating unit that calculates a total toner amount used by the developing units of the image forming unit according to the two color information obtained through the conversion of the color converting unit;
a determining unit that determines whether the total toner amount calculated by the calculating unit exceeds a threshold value, or not;
a printing unit that prints the converted image information having the two color information;
a changing unit that, when a total toner amount is larger than the threshold value, changes one of the two color information of the converted image information so that the total toner amount to be used for printing the converted image information is smaller than the threshold value; and
a method selecting unit that selects a method of changing the one of the two color information by the changing unit,
wherein the method selecting unit selects the method of changing the one of the two color information according to an attribute of the image information, and the method selecting unit changes the one of the two color information with preserving hue for an area in which the attribute of the image information is graphics or an image.

8. The image forming apparatus according to claim 7, further comprising: a setting unit that presets a charge to be paid by a user when image information is printed; and a threshold value changing unit that changes the threshold value in conformity with the charge to be set by the setting unit.

9. A non-transitory computer readable medium storing a program causing a computer to execute a process for image processing, the process comprising:
converting image information having no less than three color information into image information having two color information;
printing the converted image information having the two color information;
calculating a total toner amount used for printing the image information according to the two color information obtained through the conversion;
determining whether the calculated total toner amount exceeds a threshold value, or not;
changing one of the two color information of the converted image information so that the total toner amount to be used for printing the converted image information is smaller than the threshold value when a total toner amount is larger than the threshold value; and
selecting a method of changing the one of the two color information,
wherein the selecting the method of changing the one of the two color information occurs according to an attribute of the image information, and the changing the one of the two color information occurs while preserving hue for an area in which the attribute of the image information is graphics or an image.

10. An image processing method comprising:
converting image information having no less than three color information into image information having two color information;
printing the converted image information having the two color information;
changing one of the two color information of the converted image information so that the total toner amount to be used for printing the converted image information is smaller than the threshold value when a total toner amount is larger than the threshold value; and
selecting a method of changing the one of the two color information,
wherein the selecting the method of changing the one of the two color information occurs according to an attribute of the image information, and the changing the one of the two color information occurs while preserving hue for an area in which the attribute of the image information is graphics or an image.

11. The image processing apparatus according to claim 1, further comprising:
a selecting unit that selects a method of changing the one of the two color information based on an attribute of the image information, wherein the attribute of the image information is one of text, graphics, or image.

12. The image processing apparatus according to claim 2, further comprising:
a selecting unit that selects a method of changing the one of the two color information based on an attribute of the image information, wherein the attribute of the image information is one of text, graphics, or image.

13. The image processing apparatus according to claim 1, wherein when the total toner amount is larger than the threshold value, the changing unit changes only one of the two color information.

\* \* \* \* \*